Patented Oct. 8, 1940

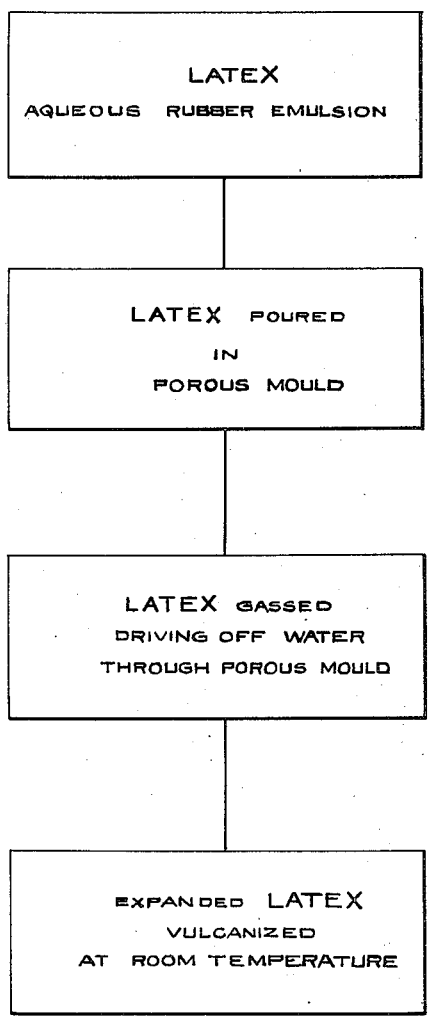

2,216,785

UNITED STATES PATENT OFFICE 2,216,785

GAS EXPANDED LATEX

Dudley D. Roberts, New York, N. Y., assignor to Rubatex Products, Inc., New York, N. Y., a corporation of Delaware Application October 31, 1936, Serial No. 108,643

5 Claims. (Cl. 260—723)

This invention relates to gas-expanded rubber and more particularly relates to a novel process for manufacturing gas-expanded rubber products with a latex base.

Heretofore in the manufacture of gas-expanded rubber products, unvulcanized rubber sheets were masticated and milled to form a rubber dough and mixed with suitable ingredients for expanding and vulcanizing the dough. The United States Patent No. 1,905,269 to G. P. Denton and the application Serial No. 717,550, filed March 27, 1934, describe successful commercial processes for manufacturing gas expanded rubber. These processes essentially comprise the steps of gassing the dough in an autoclave while subjecting it to a temperature for partially vulcanizing the dough and then finally vulcanizing and expanding the gassed dough in suitable molds. Complicated molds could not be used and accurate cutting and trimming of the gassed dough before insertion into the molds was required to insure proper expansion in the mold.

In accordance with our present invention, we contemplate manufacturing gas-expanded rubber using liquid latex as the rubber base mixed with suitable ingredients to form a gelatinous or liquid mixture for carrying out the process. A porous mold is used so that upon the high pressure gassing of the mixture, the water is forced through the mold which retains the compound in a semi-dry or dry state. We employ a vulcanizer which is effective at room temperatures and effects the vulcanization of the final product without application of heat.

By employing a liquid rubber mixture, we are enabled to use molds of the most complicated shape and form since the liquid reaches remote crevices of the mold and the expansion of the mixture accurately fills the mold. Since the curing of the gassed latex can be effected without application of heat, a simple plaster may be used for the mold since curing does not exert excessive pressures against the mold due to heating of the confined gas cells as in the conventional processes. A porcelain mold is equally suitable.

We have found that the latex mixture has a greater gas perviousness than the rubber dough compositions used in the prior art. Accordingly, the time required for gassing in the high pressure gassing chamber is diminished, making for greater economy in production by having a higher use factor of the expensive gassing equipment. The gassed latex has also been found to retain the gas upon removal from the autoclave even though no heat is applied thereto to partially cure it as the prior art requires. Due to the gas pervious character of the latex mixture, the homogeneous gassing is readily accomplished. Since no heating of the gassed dough is required, an important advantage is had over prior processes due to the extreme difficulty of uniformly internally heating a mass of rubber which is itself a good thermal insulator.

In a modified form of our process, the gassed latex is removed from the autoclave in a semi-dry condition and is subsequently dried and finally cured and expanded in a heated atmosphere to still further shorten the time necessary to retain each charge in the chamber.

In still a further modification of our present invention, the liquid latex mixture is gassed and semi-dried in the autoclave and also semi-cured therein, and then removed. The semi-cured gassed latex is then finally cured in a mold or in hot air.

Our process of manufacturing gas-expanded rubber is less expensive than conventional processes due to the shorter gassing cycle required wherein a greater utilization of the autoclave equipment is had, and also due to the cheaper molds and final curing stage required, since the final curing does not require expensive steam platens or electric ovens using pressure resisting molds, but rather is curable at a relatively low temperature and low internal pressure.

It is accordingly an object of our invention to provide a novel process for manufacturing gas-expanded rubber material using a liquid latex base.

It is another object of our invention to provide a novel process for manufacturing gas-expanded rubber products using a liquid or gelatinous mixture expandible in very complicated forms.

It is a further object of our present invention to simplify and reduce the production costs in the manufacture of gas-expanded rubber materials.

It is still a further object of our invention to provide a novel process in the manufacture of gas-expanded rubber products wherein the final curing of the rubber is carried out at room temperature or at relatively moderately heated conditions.

These and further objects of our present invention will become apparent in the following description and in the appended claims.

In carrying out our process, we employ a liquid latex concentrated as it comes from the tree having a composition of approximately 60% rubber and 40% water. The composition of the mixture which we have found yields very satisfactory results contains approximately the following proportions by weight:

| | Per cent |
|---|---|
| Concentrated latex | 94 |
| Sulphur | 1 |
| Butyl zymate | 1 |
| Darvan | 1 |
| Zinc oxide | 1 |
| Sodium hydroxide | 2 |

The physical appearance of this mixture is that of a milky white liquid. Other ingredients and proportions are feasible. Latex either more concentrated or more dilute than here specified may be used.

Darvan is a dispersing agent for latex. It is a synthetic organic chemical. Physically it is a gray-brown powder with a specific gravity of 1.6. It is non-toxic. It does not cause frothing nor does it ferment or affect the aging properties of rubber. It is manufactured by Dewey and Almy of Cambridge, Massachusetts.

In one modification, the latex mixture is poured into a porous mold or on a porous plate. A plaster or porcelain material may be used to provide the porosity required for confining the mixture in the gassing chamber. The gassing of the latex mixture is carried out in a gassing chamber or autoclave preferably at a pressure of the order of 3000 pounds of nitrogen gas. Different inert gases and gas pressures may be used as practised in the art. The gas pressure forces the water in the mixture through the porous walls, leaving a gas impregnated mass in a semi-dry state.

The latex mixture is very pervious to the gas and is readily homogeneously gassed in the chamber. Thorough gassing is accomplished, in most instances, in about one and one-half hours. No heating is necessary at this stage to produce a semi-dry, thoroughly gassed dough. When the gas pressure is released, the latex is found to be coagulated and expanded to approximately four times its initial volume. The gassed latex expands after the water has been partially removed and the pressure is released. The gassed latex may then be removed from the porous mold and is permitted to dry. It vulcanizes at room temperature due to the powerful accelerator, butyl zymate, employed. Butyl zymate vulcanizes the latex at room temperature without application of heat. When the product is finally dry, the process is completed. The product may be made soft or medium hard by using the composition hereinbefore stated. To produce hardened expanded latex, it is necessary to add a further ingredient, for example liquid Bakelite, to the latex mixture.

In a modified form of our process, the gassing period of the latex mixture is relatively shortened and the semi-dry gassed dough is quickly removed from the autoclave to a heated chamber or room containing hot air where the final curing of the product is carried on. The temperature of the hot room is less than the temperatures employed in the heated platens or ovens used in prior processes; it is a temperature rather for drying the material, since the vulcanization can be effected at room temperatures as already stated. By reducing the gassing period, a greater amount of latex can be gassed in a given time, making for more economical utilization of the gassing equipment for reducing production costs of the expanded latex products.

A further modification of my process is somewhat similar to the process described in the Denton patent referred to hereinabove in that the charge is semi-cured while it is in the autoclave. In accordance with this modification, the latex mixture is poured in a mold or a porous plate and subjected to a pressure of the order of 3000 pounds per square inch in an autoclave. The water is forced out through the porous walls of the mold and a semi-dry mixture is produced. When the latex is semi-dry, the autoclave is heated by steam pressure in a manner well known in the art to a semi-curing temperature while maintaining the gaseous pressure in the autoclave. It is accordingly noted that this modification differs from the Denton process in that it is necessary to force the water out of the mixture during the gassing thereof before the mixture is subsequently partially vulcanized. The remainder of this process comprises in cooling the chamber and then finally releasing the gas pressure and removing the coagulated charge from the chamber. The gassed latex is then finally vulcanized and dried in a mold at suitable temperature or in hot air.

Our process may be carried out with various other modifications than those described. It is to be understood that the latex used as the base of the mixture may be in concentrated or dilute form and may be mixed in varying percentages with sulphur, fillers and accelerators and other compounding ingredients known in the art. The mixture may be gassed at any stage in the process, for example before forming in molds. It is not necessary to use a porous mold since the drying of the mixture may be carried out subsequent to the gassing thereof. A porous mold is used when the mixture is dried by the action of the gaseous pressure which forces the moisture through the porous walls. However, by subsequent drying, which may be aided by heating, standard non-porous molds may be used for the gassing and coagulated stages.

The gassing of the latex mixture need not be carried out in the molds to which it is to be finally formed but may be carried out in any container and subsequently molded and dried. The latex mixture may be gassed in a liquid state, causing gas bubbles to form throughout the mixture. By using a suitable jelling agent such as sodium silico fluoride in the latex mixture, it is caused to set, confining the gas bubbles therein. A jelled mass containing a multitude of gas bubbles results, which may be molded and dried to form the gas expanded latex product.

A liquid latex mixture containing a jelling agent may be gassed in non-porous molds to cause the formation of a myriad of minute gaseous bubbles which are held therein by the jelling of the mass. The gassed mixture swells to fill the mold and may be removed therefrom after setting. The jelled, molded mass is then dried to complete the process.

The drawing shows diagrammatically the process described above.

Although particular compositions and conditions of production of expanded latex products have been described, modifications are feasible which fall within the broader spirit and scope of our present invention and we accordingly do not intend to be limited except as set forth in the following claims.

We claim:

1. The method of manufacturing gas expanded rubber products which comprises placing rubber in liquid form in a porous structure, subjecting the rubber to a neutral gas at a pressure of the order of 3000 pounds per square inch to force the water in the rubber through said porous structure to dry and gas impregnate the rubber, releasing the gaseous pressure to permit expansion of the rubber to fill the structure, and finally drying and curing the gas expanded rubber.

2. The method of manufacturing gas expanded rubber products which comprises placing rubber in liquid form in a porous mold, subjecting the rubber to a neutral gas at high pressure to force the water in the rubber through said porous mold to partially dry and gas impregnate the rubber, releasing the gaseous pressure to permit expansion of the rubber to fill the mold, and heating the rubber for final drying and vulcanization thereof.

3. The method of manufacturing gas expanded gas retaining latex products which comprises placing latex in aqueous form in a porous mold, subjecting the latex to a neutral gas at high pressure to force the water in the latex through said porous mold to partially dry and gas impregnate the latex, then heating the latex to partially vulcanize it, releasing the gaseous pressure to permit expansion of the latex to fill the mold, and heating the latex for final drying and vulcanization thereof.

4. The method of producing gas expanded latex products which comprises forming an aqueous latex mixture; placing the aqueous latex mixture in a porous mold; subjecting the aqueous latex mixture to a neutral gas at a relatively high pressure to drive off the water and to gas impregnate the latex; expanding the gas impregnated latex and vulcanizing the gas expanded latex structure to a permanent cure.

5. The method of manufacturing gas expanded gas retaining latex products which comprises placing latex in aqueous form in a porous mold, subjecting the latex to a neutral gas at high pressure to force the water in the latex through said porous mold to partially dry and gas impregnate the latex, releasing the gaseous pressure to permit expansion of the latex, and vulcanizing the gas expanded gas retaining latex.

DUDLEY D. ROBERTS.